United States Patent Office 3,317,382
Patented May 2, 1967

3,317,382
SUBSTITUTED 5-PHENYLSALICYLIC ACID COMPOUNDS FOR THE PREVENTION AND TREATMENT OF ERYTHEMA
Matthew J. Brunner, Flossmor, Paul Finkelstein, Wilmette, Herbert E. Hibnick, Elmwood Park, Stephen Sichak, Chicago, and Elliott N. Schubert, Skokie, Ill., assignors to The Gillette Company, Chicago, Ill., a corporation of Delaware
No Drawing. Original application May 26, 1959, Ser. No. 815,792. Divided and this application Dec. 7, 1962, Ser. No. 253,013
32 Claims. (Cl. 167—58)

This application is a division of application of Ser. No. 815,792 filed on May 26, 1959, which is now abandoned.

This invention relates to substituted 5-phenylsalicylic acid compounds and to compositions containing the same as well as to methods for the use of such compositions, and, more particularly, to such compounds adaptable as compositions for external use.

The compounds comprising the principal active ingredients of the novel compositions herein can be more specifically described as compounds related to the known 5-phenylsalicylic acid. These compositions include as the principal active ingredient at least one compound represented by the formula:

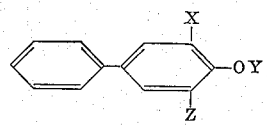

wherein X is (1) hydrogen, (2) acetyl, (3) amino and acid addition salts of such compounds, or (4) the radical —CH$_2$CH=CH$_2$; Y is (1) hydrogen, (2) lower alkyl containing 1 through 5 carbon atoms, or (3) acyl containing 1 through 5 carbon atoms; and Z is (1) carboxyl, (2) carbalkoxy in which the alkyl group contains 1 through 5 carbon atoms, (3) carbaryloxy, (4) the radical

—COOCH$_2$CH$_2$N(CH$_3$)$_2$ and acid addition salts of such compounds, (5) the radical —COOCH$_2$CH$_2$NHC(CH$_3$)$_3$ and acid addition salts of such compounds, (6) the radical

and the acid addition salts of such compounds, (7) the radical —COOCH$_2$CF$_3$, (8) the radical

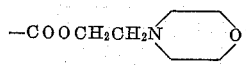

or (9) the radical

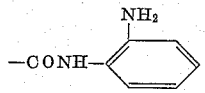

dispersed in a pharmaceutically acceptable dermatologic base. By "acid addition salts" as employed in conjunction with certain of the above compounds is meant the physiologically acceptable salts of such compounds, such as the acid addition salts in which the acid group is hydrochloric, sulfuric, acetic, hydrobromic, phosphoric, citric, tartaric, and the like.

The foregoing compositions are useful in the treatment of erythema of many origins, particularly those arising through over-exposure to the sun. Frequently the treatment of sun-induced erythema (erythema solare) with conventional emollients and commercial preparations requires that the affected area be protected from re-exposure until healing is virtually complete. Where the subject desires protection against severe burn but nevertheless wishes to acquire a tan, the problem is further complicated, for an effective screening agent commonly prevents or greatly diminishes tanning. The principal active ingredients described above, when incorporated in appropriate formulations for topical use, offer advantageous properties in prevention and treatment of sunburn while, in many instances, permitting development of desirable tan. In addition, these compositions can be employed concurrently with or subsequent to the use of topical preparations applied to the skin or hair of individuals for cosmetic or other purposes where the use of such topical preparations may be accompanied by the development of localized erythema or similar irritation. The present compositions are likewise useful in the treatment of a wide variety of skin afflictions accompanied by erythema. Thus, the compositions of this invention possess ameliorative and therapeutic properties in the treatment of an established erythema as well as being useful as a preventive measure where erythema-inducing agents are likely to be encountered.

The compounds comprising the principal active ingredients of these novel compositions possess in common the property of preventing the onset of erythema or speeding the recovery of affected sites from the effects of erythema. The term "principal active ingredients" therefore relates to such compounds employed either singly, in combination one with another, or in combination with other types of active ingredients which lend additional qualities to the compositions whereby their usefulness and effectiveness are extended. The unexpected topical activity of the compounds constituting the principal active ingredients is realized through provision of the present compositions in which the said principal active ingredients are dispersed in a pharmaceutically acceptable dermatologic base. By "dermatologic base" is meant a vehicle or carrier suitable for application to the skin, i.e. for topical or external use.

The particular pharmaceutical forms adaptable to the purposes of this invention include ointments, lotions, pastes, jellies, powders, and the like, ointments and lotions normally being preferred. As used in the specification and claims herein, the term "ointment" embraces formulation having oleaginous, absorption, water-soluble and emulsion-type bases as defined and described in Remington's Practice of Pharmacy, 11th edition (1956), page 336, Mack Publishing Company, Easton, Pennsylvania. Of the various types of bases mentioned, the emulsion type is preferred, the said emulsion bases being either of the oil-in-water or water-in-oil classes and specifically including creams which are solid emulsions containing suspensions or solutions for external use. The term "lotion" refers to liquid suspensions or dispersions stabilized by the presence of suspending agents, surface active agents, or both, and designed likewise for external application.

Broadly described, the method for the preparation of the present compositions involves the incorporation of one or more of the said principal active ingredients, together with any complementary active or supplementary ingredients, into an ointment (including a cream), lotion, paste, jelly, powder, or the like, utilizing techniques well known in the art. The amount of the principal active ingredient can be varied widely without detracting substantially from the usefulness of the resulting composition. For most purposes, a small percentage of the principal active ingredient is sufficient to produce a beneficial effect, the minimum quantity depending on the severity of the erythema, the particular erythema-inducing agent involved, the sensitivity of the particular individual to the agent producing the erythema, and the individual's susceptibility to the particular principal active ingredient of the composition employed. Similarly, it is difficult to identify specifically an upper limit of concentration of the principal active ingredient inasmuch as the ameliorative or therepeutic benefits of the higher concentrations will be subject to the same variables as is the lower concentration limit. However, in general the effective range of concentration of principal active ingredient is from about 0.001% to about 10% by weight. From about 0.5% to about 3% represents a range which is satisfactory in the majority of instances. These compositions are employed in the customary manner for applying topical medicaments, i.e., by inunction to the affected area.

As suggested above, various complementary active ingredients can be employed with the said principal active ingredients to provide a desirable adjunctive ameliorative or therapeutic effect. Thus, local or topical anesthetics such as benzyl alcohol and menthol can be incorporated in the formulation. Likewise, such antibacterials and antibiotics as bacitracin, polymyxin and neomycin, and antiseptics such as hexachlorophene, phenol, the essential oils, camphor, oil of cloves, oil of eucalyptus and allantoin can be included.

The compositions of this invention typically include, in addition to the foregoing principal and complementary active ingredients, such materials as emulsifying agents, solvents, anti-oxidants, preservatives, buffers, perfumes and bodying materials which confer on the product a desired consistency rendering it adaptable to topical application. Preferably, the compositions represent an emulsified base into which the principal active ingredients are incorporated to produce an ointment, including a cream, or a lotion.

Laboratory and clinical studies have indicated that the present compositions not only possess a high degree of efficacy in treatment of the conditions indicated, but additionally are well tolerated and otherwise suitable for human use. Extensive clinical studies utilizing mustard oil tests and ultraviolet light burn tests have been conducted on human subjects to assess the potency and acceptability of these compositions. In the mustard oil test, erythema is induced by exposing a number of predetermined areas on the skin of the forearms of human subjects to gauze patches saturated with mustard oil. After a specified period of time, the patches are removed and the skin is seen to be erythematous. The composition under test is applied by inunction to certain of the erythematous areas, and suitable control formulations are applied to the other areas. Each treated area is then covered with a clean gauze patch and the medication allowed to remain for a specified time. The patches are then removed and the formulations evaluated from comparative observations of the medicated and control areas.

In the ultraviolet sunburn test, erythema is induced by exposing the skin of the lumbar region of the back of human subjects to a sun lamp. A number of predetermined areas are exposed for a specified period of time at a constant distance from the light source. Immediately following exposure, the control and medicated formulations are applied to the affected areas by inunction, and each area is covered with a gauze patch. The patches are allowed to remain for a specified time, after which they are removed and comparative observations made as before.

Results in the foregoing tests are recorded as "satisfactory" or "unsatisfactory." If the medicated area is observed to be equally erythematous or more erythematous than the control area, the test medication is recorded as "unsatisfactory." If, on the other hand, the medicated area is seen to be definitely less erythematous than the control area, the test medication is recorded as "satisfactory."

The utility of the compositions of this invention can best be illustrated by reference to specific examples of formulations with which clinical results were obtained.

Accordingly, the following examples are illustrative of the novel compositions and methods for their use as contemplated in the present invention, as well as illustrative of the preparation of certain novel compounds of this invention, but such examples are not to be construed as limiting.

*Example 1.—3-acetyl-5-phenylsalicylic acid*

The novel 3-acetyl-5-phenylsalicylic acid of the formula

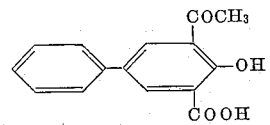

was prepared by the procedure which follows. To a round-bottom flask was added 18.3 gm. of 2-acetoxy-5-phenylbenzoic acid and 91.5 gm. of dry nitrobenzene. The resulting solution was heated to 60° C. and 20.2 gm. of anhydrous aluminum chloride added in portions. The temperature of the reaction mixture was maintained at 60° C. for 8 hours. The resulting material was poured into an ice-hydrochloric mixture to yield a yellow gummy precipitate. The solid was recrystallized from benzene and washed with hot ligroin. The ligroin-insoluble fraction was then recrystallized from ethyl acetate to give 2.5 gm. of 3-acetyl-5-phenylsalicylic acid, M.P. 240–242° C. Cooling of the ligroin filtrate gave 2.8 gm. of a light yellow solid, M.P. 209–210° C. Infra-red spectra indicated the higher melting material to be the 3-acetyl product.

The 3-acetyl-5-phenylsalicylic acid was found to exhibit anti-erythema activity. In concentrations of 2%, the 3-acetyl-5-phenylsalicylic acid in appropriate bases was employed topically against experimentally induced erythema in humans a total of 6 times. Results were "satisfactory" 3 times. Generally, concentrations of about 0.001% to tbout 10% are effective, from about 0.5% to about 3% being preferred.

A suitable cream incorporating 3-acetyl-5-phenylsalicylic acid is prepared by first mixing the oil-soluble and water-soluble components independently and then intermixing the oil and water fractions, employing the following ingredients:

| | Percent |
|---|---|
| Stearic acid | 18.0 |
| White mineral oil | 5.0 |
| Propylene glycol | 5.0 |
| Glyceryl monostearate | 5.0 |
| Potassium hydroxide | 1.0 |
| Methylparaben | 0.1 |
| Propylparaben | 0.05 |
| 3-acetyl-5-phenylsalicyclic acid | 2.0 |
| Water, q.s. | |

Application of the above cream by inunction twice daily to the erythematous area provides early relief from the erythema.

*Example 2.—3-amino-5-phenylsalicylic acid*

The novel 3-amino-5-phenylsalicylic acid of the formula

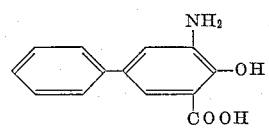

was prepared by the procedure which follows. To a round-bottom flask was added 20.0 gm. of 5-phenylsalicylic acid and 150 ml. of glacial acetic acid. The resulting solution was heated to 100° C. and a solution of 5.86 gm. of concentrated nitric acid in 36 ml. of glacial acetic acid was added thereto rapidly and with stirring. The reaction mixture was heated on a steam bath for 2 hours and then poured over crushed ice to give a yellow precipitate. The precipitate was dissolved in hot butyl ether and the solution decolorized with charcoal, producing on cooling 12.0 gm. (50% of theoretical) of 3-nitro-5-phenylsalicylic acid, M.P. 181–184° C.

*Nitrogen analysis.*—Calculated 5.87%; found, 5.99%.

To a pressure bottle was then added 9.0 gm. of the 3-nitro-5-phenylsalicylic acid prepared as above and 100 ml. of ethanol containing 1.0 gm. of 10% palladium-charcoal catalyst. The resulting mixture was hydrogenated at 50–55 p.s.i. The product was filtered to remove the catalyst, yielding an ethanol solution of 3-amino-5-phenylsalicylic acid. The said 3-amino-5-phenylsalicylic acid ethanol solution was then treated with dry hydrogen chloride and the resulting solution poured into ether to precipitate a solid. The solid was washed with methyl ethyl ketone to give 2.5 gm. (28% of theoretical) of 3-amino-5-phenylsalicylic acid hydrochloride, M.P. 246–248° C.

*Nitrogen analysis.*—Calculated, 5.25%; found, 5.60%.

Treatment of the 3-amino-5-phenylsalicylic acid with an acid other than hydrochloric, as represented in the hydrogen chloride above, e.g., with such acids, producing dermatologically acceptable acid addition salts, as sulfuric, acetic, hydrobromic, phosphoric, citric, tartaric and the like, is productive of similarly useful acid addition salts of the said 3-amino-5-phenylsalicylic acid.

The 3-amino-5-phenylsalicylic acid and its dermatologically acceptable acid addition salts, preferably the hydrochloride, are effective anti-erythema agents. For example, formulations incorporating 2% 3-amino-5-phenylsalicylic acid hydrochloride were employed against experimentally induced erythema in humans a total of 18 times. Results were "satisfactory" 13 times. Generally, concentrations of about 0.001% to about 10% are effective, from about 0.5% to about 3% being preferred.

A suitable lotion incorporating 3-amino-5-phenylsalicylic acid hydrochloride can be prepared by the procedure of Example 1 from the following materials:

| | Percent |
|---|---|
| White mineral oil | 7.0 |
| Ethylene glycol monostearate | 3.0 |
| Glyceryl monostearate | 3.0 |
| Lanolin | 1.0 |
| Stearic acid | 1.0 |
| Sodium hydroxide | 0.5 |
| Propylene glycol | 4.5 |
| Propylparaben | 0.05 |
| Methylparaben | 0.1 |
| Perfume | 0.2 |
| 3-amino-5-phenylsalicylic acid hydrochloride | 2.0 |
| Water, q.s. | |

Application of the above lotion by inunction to affected areas twice daily gives early reduction of the erythema.

Substitution of other dematologically acceptable acid addition salts, such as the sulfate, acetate, hydrobromide, phosphate, citrate, tartrate and the like, for the hydrochloride above give similarly effective compositions.

*Example 3.—Methyl-3-allyl-5-phenylsalicylate*

The novel methyl-3-allyl-5-phenylsalicylate of the formula

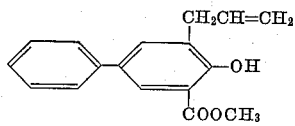

was prepared by the procedure which follows. To a 300-ml. round-bottom flask was added 22.8 gm. of methyl-5-phenylsalicylate, followed by 12.1 gm. of allyl bromide, 16.5 gm. of potassium carbonate and 110 ml. of methyl ethyl ketone. The resulting mixture was refluxed with mechanical stirring for 12 hours, at which time the mixture gave a negative ferric chloride test. The salts were removed by filtration of the cooled mixture, and the filtrate was diluted with ether. The ether solution was then washed with water and dried over anhydrous sodium sulfate. After distillation of the ether, the residue was distilled, yielding 20 gm. of a colorless oily liquid, B.P. 150–153° C. at 0.1 mm. This material had a purity of 82% as determined from the saponification equivalent. Redistillation produced a pure fraction of 6 gm. of methyl-3-allyl-5-phenylsalicylic, B.P. 169–170° C. at 0.55 mm., $n_D^{24}$ 1.6015. Saponification equivalent: calculated, 268; found, 270.

Other 3-allyl lower alkyl esters are prepared by substituting the appropriate ester of 5-phenylsalicylic acid for the methyl-5-phenylsalicylate above. For example, use of ethyl-, propyl-, butyl- or pentyl-5-phenylsalicylate in the foregoing reaction gives the corresponding lower alkyl-3-allyl-5-phenylsalicylate.

The lower alkyl-3-allyl-5-phenylsalicylates possess anti-erythema activity. For example, in concentrations of 1–2%, the methyl-3-allyl-5-phenylsalicylate in various formulations was employed topically against experimentally induced erythema in humans a total of 24 times. Results were "satisfactory" 21 times. Generally, concentrations of about 0.001% to about 10% are effective, from about 0.5% to about 3% being preferred.

A cream having the below indicated composition is prepared by the method of Example 1:

| | Percent |
|---|---|
| White mineral oil | 5.0 |
| Stearic acid | 18.0 |
| Propylene glycol | 5.0 |
| Potassium hydroxide | 1.0 |
| Propylparaben | 0.05 |
| Methylparaben | 0.1 |
| Perfume | 0.2 |
| Methyl-3-allyl-5-phenylsalicylate | 1.0 |
| Water, q.s. | |

Application of the above formulation by inunction to the affected area twice daily affords early reduction of the erythema.

Other lower alkyl-3-allyl-5-phenylsalicylates, such as, for example, ethyl-, propyl-, butyl- or pentyl-5-phenylsalicylate, can be substituted for the methyl-3-allyl-5-phenylsalicylate of the foregoing formulation to give a similarly effective topical preparation.

*Example 4.—Methyl-2-methoxy-5-phenylbenzoate*

The novel methyl-2-methoxy-5-phenylbenzoate of the formula

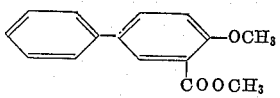

was prepared by the procedure which follows. To a 500-ml. round-bottom flask was added 45.6 gm. of methyl-5-phenylsalicylate, 33 gm. of potassium carbonate and 200 ml. of methyl ethyl ketone. The resulting mixture was heated to reflux and stirred continuously. A total of 25.2 gm. of dimethyl sulfate was added dropwise to the refluxing solution and reflux continued for 42 hours. After cooling, the solution was filtered to remove the salts, and the light yellow filtrate was diluted with ether. The ether solution was then washed with water and dried over anhydrous sodium sulfate. After removal of the ether by distillation, the viscous yellow residue was distilled, yielding 31 gm. of a colorless viscous liquid, B.P. 149° C. at 0.4 mm. On standing overnight, the methyl-2-methoxy-5-phenylbenzoate product solidified to a white waxy mass, M.P. 49–51° C. Saponification equivalent: calculated, 242; found, 245.

Substitution of other lower alkyl-5-phenylsalicylates for the methyl-5-phenylsalicylate above, such as for example, ethyl-, propyl-, butyl or pentyl-5-phenylsalicylate, gives the corresponding lower alkyl-2-methoxy-5-phenylbenzoate. Likewise, in combination with any of the foregoing substitutions the replacement of dimethyl sulfate with other lower dialkyl sulfates, such as, for example, diethyl, dipropyl, dibutyl or dipentyl sulfate, produces the corresponding lower alkyl-2-lower alkyloxy-5-phenylbenzoates.

The lower alkyl-2-lower alkyloxy-5-phenylbenzoates possess anti-erythema activity. For example, various formulations containing 2% methyl-2-methoxy-5-phenylbenzoate were employed topically against experimentally induced erythema a total of 18 times. Results were "satisfactory" 16 times. Generally, concentrations of about 0.001% to about 10% are effective, from about 0.5% to about 3% being preferred.

A lotion suitable for use in the treatment of erythema can be prepared by the method of Example 1 from the following ingredients:

|  | Percent |
|---|---|
| Stearic acid | 2.5 |
| Ethylene glycol monostearate | 0.75 |
| Mineral oil | 4.5 |
| Lanolin | 0.5 |
| Methylparaben | 0.1 |
| Sorbitol, 70% aqueous solution | 4.5 |
| Magnesium aluminum silicate | 0.4 |
| Sodium hydroxide | 0.5 |
| Perfume | 0.2 |
| Methyl-2-methoxy-5-phenylbenzoate | 2.0 |
| Water, q.s. | |

Application of the above lotion by inunction twice daily to affected areas gives early relief from the erythema.

Other lower alkyl-2-lower alkyloxy-5-phenylbenzoates as indicated above can be substituted for the methyl-2-methoxy-5-phenylbenzoate of the foregoing formulation to give similarly effective topical compositions.

*Example 5.—Methyl-2-acetoxy-5-phenylbenzoate*

The novel methyl-2-acetoxy-5-phenylbenzoate of the formula

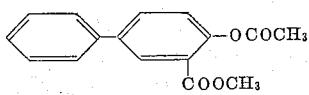

was prepared by the procedure which follows. To a round-bottom flask was added 11.4 gm. of methyl-5-phenylsalicylate, 20.4 gm. of acetic anhydride and 1 ml. of pyridine. The resulting solution was refluxed for 4½ hours. The reaction mixture was then poured over crushed ice and the resulting precipitate washed several times with water to remove occluded acetic anhydride. Recrystallization from methanol yielded 7.1 gm. of methyl-2-acetoxy-5-phenylbenzoate as a white crystalline solid, M.P. 62–63.5° C. Saponification equivalent: calculated, 270; found, 270.

Other 2-esters can be prepared by substituting for the acetic anhydride above other acylating agents in which the acyl radical is that of a hydrocarbon carboxylic acid having from 1 through 5 carbon atoms. Likewise, and in combination with the foregoing substitutions, other lower alkyl-5-phenylsalicylates, in which the lower alkyl groups contain from 1 through 5 carbon atoms, can replace the methyl-5-phenylsalicylate exemplified to give the corresponding lower alkyl-2-acyloxy-5-phenylbenzoates.

The lower alkyl-2-acyloxy-5-phenylbenzoates exhibit marked anti-erythema activity. For example, in various formulations, the methyl-2-acetoxy-5-phenylbenzoate was employed topically in a concentration of 2% against experimentally induced erythema in human subjects a total of 22 times. Results were "satisfactory" a total of 20 times. Generally, concentrations of about 0.001% to about 10% are effective, from about 0.5% to about 3% being preferred.

A suitable formulation for the topical treatment of erythema is prepared by the method of Example 1 from the following materials:

|  | Percent |
|---|---|
| Mineral oil | 7.0 |
| Glyceryl monostearate | 3.0 |
| Ethylene glycol monostearate | 3.0 |
| Lanolin | 1.0 |
| Stearic acid | 1.0 |
| Methylparaben | 0.1 |
| Propylparaben | 0.05 |
| Propylene glycol | 4.5 |
| Potassium hydroxide | 0.5 |
| Methyl-2-acetoxy-5-phenylbenzoate | 2.0 |
| Water, q.s. | |

Application of the above formulation by inunction twice daily to affected areas affords effective treatment of the erythema.

Substitution of other lower alkyl-2-lower alkanoyloxy 5-phenylbenzoates as indicated above for the methyl-2-acetoxy-5-phenylbenzoate of the foregoing formulation is productive of similarly effective compositions.

*Example 6.—Phenyl-5-phenylsalicylate*

The novel phenyl-5-phenylsalicylate of the formula

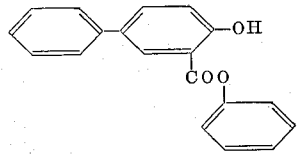

was prepared by the procedure which follows. To a three-neck, round-bottom flask equipped with a mechanical stirrer and reflux condenser was added 18.8 gm. of phenol and 42.8 gm. of 5-phenylsalicylic acid. After briefly stirring the resulting mixture, 30.6 gm. of phosphorus oxychloride was added cautiously thereto. No apparent increase in temperature was noted on addition of the phosphorus oxychloride. The mixture was then heated on a steam bath with continuous stirring for 16 hours. At the end of this period the excess phosphorus oxychloride was removed under vacuum. The red viscous material remaining was recrystallized from methanol-charcoal to give 18 gm. of phenyl-5-phenylsalicylate, M.P. 83–84° C. The saponification equivalent indicated a purity of 98.9%.

The phenyl-5-phenylsalicylate was found to possess anti-erythema activity. Various formulations containing 2% of the said active ingredient have been employed against experimentally induced erythema in humans by inunction to the affected areas a total of 24 times. Results were "satisfactory" 17 times. Generally, concentrations of about 0.001% to about 10% are effective, from about 0.5% to about 3% being preferred.

A cream suitable for use in the treatment of erythema can be prepared by the method of Example 1 from the following ingredients:

|  | Percent |
|---|---|
| Glyceryl monostearate | 5 |
| Cetyl alcohol | 5 |
| Light mineral oil | 12.5 |
| Propylene glycol | 5 |
| Sorbitan monostearate | 2.3 |
| Poloxyethylene stearate, solid | 3.7 |
| Tetrasodium ethylenediamine tetra-acetate dihydrate | 0.2 |
| Sodium sulfite | 0.1 |
| Methylparaben | 0.1 |
| Propylparaben | 0.05 |
| Phenyl-5-phenylsalicylate | 2.0 |
| Water, q.s. | |

The above cream is applied by inunction twice daily to the affected areas to give early relief from the erythema.

Example 7.—Butyl-5-phenylsalicylate

The novel butyl-5-phenylsalicylate of the formula

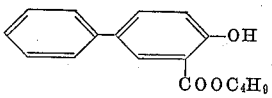

was prepared by the procedure which follows. To a round-bottom flask was added 53.6 gm. of 5-phenylsalicylic acid, 74.12 gm. of n-butanol and 1.0 ml. of concentrated sulfuric acid. The resulting mixture was heated at reflux with constant stirring for 48 hours. The excess butanol was removed under vacuum and the light yellow, viscous residue was distilled twice under vacuum to give 57 gm. of butyl-5-phenylsalicylate (85% of theoretical), B.P. 169° C. at 0.95 mm., purity determined by saponification equivalent, 99.5%.

Butyl-5-phenylsalicylate was found to exhibit antierythema activity. In various formulations, the said active ingredient was employed topically in a concentration of 1–2% against experimentally induced erythema in human subjects a total of 12 times. Results were "satisfactory" 11 times. Generally, concentrations of about 0.001% to about 10% are effective, from about 0.5% to about 3% being preferred.

A suitable ointment for the topical treatment of erythema is prepared by the method of Example 1 from the following materials:

| | Percent |
|---|---|
| White mineral oil | 12.5 |
| Glyceryl monostearate | 5.0 |
| Cetyl alcohol | 5.0 |
| Diethyleneglycol monoethyl ether | 5.0 |
| Polyoxyethylene stearate (having 100 moles of ethylene oxide) | 1.5 |
| Sorbitan monostearate | 4.0 |
| Propylparaben | 0.05 |
| Methylparaben | 0.1 |
| Perfume | 0.2 |
| Butyl-5-phenylsalicylate | 1.0 |
| Water, q.s. | |

The above formulation can be applied by inunction twice daily to the affected areas as treatment for erythema.

Substitution of other lower alkyl-5- phenylsalicylates, such as methyl-, ethyl-, propyl- and pentyl-5-phenylsalicylate, gives a similarly effective composition.

Example 8.—Methyl-5-phenylsalicylate

A suitable topical formulation for the treatment of erythema employing methyl-5-phenylsalicylate of the formula

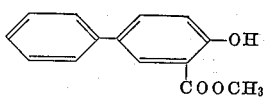

is prepared, for example, by substitution of 2.0% methyl-5-phenylsalicylate for the methyl-2-acetoxy-5-phenylbenzoate in the formulation of Example 3.

The above indicated formulation has been employed topically against experimentally induced erythema in human subjects a total of 10 times. Results were "satisfactory" all 10 times. Generally, concentrations of about 0.001% to about 10% are effective, from about 0.5% to about 3% being preferred.

Various other formulations incorporating methyl-5-phenylsalicylate in concentrations of 1–2% have been tested topically on human subjects against experimentally induced erythema 64 times. Results were "satisfactory" 55 times.

Example 9.—Ethyl-5-phenylsalicylate

A suitable ointment for the topical treatment of erythema embodying ethyl-5-phenylsalicylate of the formula

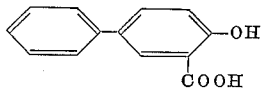

is prepared by the method of Example 1 from the following materials:

| | Percent |
|---|---|
| Stearic acid | 18.0 |
| Light white mineral oil | 5.0 |
| Propylparaben | 0.05 |
| Propylene glycol | 5.0 |
| Sodium hydroxide | 1.0 |
| Methylparaben | 0.1 |
| Ethyl-5-phenylsalicylate | 1.5 |
| Water, q.s. | |

Ethyl-5-phenylsalicylate was found to demonstrate antierythema activity. In various formulations, the said active ingredient was employed topically in concentrations of 0.1–2.0% against experimentally induced erythema in human subjects a total of 30 times. Results were "satisfactory" 20 times. Generally, concentrations of about 0.001% to about 10% are effective, from about 0.5% to about 3% being preferred.

Example 10.—5-phenylsalicylic acid

A suitable cream formulation for the topical treatment of erythema incorporating 5-phenylsalicylic acid of the formula

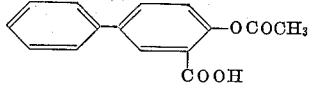

is prepared by the method of Example 1 from the following ingredients:

| | Percent |
|---|---|
| Stearyl alcohol | 12.5 |
| Petroleum jelly | 12.5 |
| Polyethylene glycol 400 | 20.0 |
| Polyoxyethylene lauryl ether, liquid | 2.0 |
| Polyoxyethylene lauryl ether, solid | 4.0 |
| Sodium sulfite | 0.1 |
| Triethanolamine, q.s. pH 7. | |
| 5-phenylsalicylic acid | 2.0 |
| Water, q.s. | |

The foregoing cream has been employed topically against experimentally induced erythema in human subjects a total of 30 times. Results were "satisfactory" 28 times. Generally, concentrations of about 0.001% to about 10% are effective, from about 0.5% to about 3% being preferred.

Various other formulations incorporating 5-phenylsalicylic acid in concentrations of 0.10–20% have likewise been topically tested on human subjects a total of 886 times. In these tests, results were "satisfactory" 759 times.

Example 11.—2-acetoxy-5-phenylbenzoic acid

A suitable cream ointment for the topical treatment of erythema incorporating 2-acetoxy-5-phenylbenzoic acid of the formula is prepared by the method of Example 1 from the following materials:

| | Percent |
|---|---|
| Petrolatum | 12.5 |
| Stearyl alcohol | 12.5 |
| Polyoxyethylene lauryl ether, solid | 4.0 |
| Polyoxyethylene lauryl ether, liquid | 2.0 |
| Polyethylene glycol 400 | 20.0 |
| Sodium sulfite | 0.1 |
| 2-acetoxy-5-phenylbenzoic acid | 2.0 |
| Water, q.s. | |

Various formulations containing 2% 2-acetoxy-5-phenylbenzoic acid have been employed topically against experimentally induced erythema in human subjects a total of 17 times. Results were "satisfactory" 15 times. Generally, concentrations of about 0.001% to about 10% are effective, from about 0.5% to about 3% being preferred.

Substitution of other 2-lower acyloxy-5-phenylbenzoic acids, such as those in which the acyl group contains from 1 through 5 carbon atoms, for the 2-acetoxy-5-phenylbenzoic acid above is productive of similarly effective compositions.

*Example 12.—β-(Morpholino)ethyl-5-phenylsalicylate hydrochloride*

The novel β-(morpholino)ethyl-5-phenylsalicylate hydrochloride of the formula

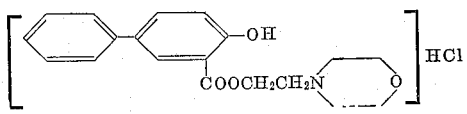

was prepared by the procedure which follows. To a 2-liter round-bottom flask fitted with a Dean-Stark water trap was added 114 gm. of methyl-5-phenylsalicylate, 70 gm. of β-hydroxyethylmorpholine, 10 gm. of sodium methoxide and 750 ml. of ligroin (B.P. 100–110° C.). The mixture was refluxed with stirring for 24 hours, at which time the separation of methanol was complete. After filtering the hot reaction mixture to remove sodium methoxide, the filtrate was cooled, causing the product to settle out as a brown oily layer. This layer was dissolved in ether and the resulting solution washed with water until the washings were no longer alkaline. The β-(morpholino)ethyl-5-phenylsalicylate ether solution was then dried over anhydrous sodium sulfate. Dry hydrogen chloride was then admitted to the ether solution of the thus isolated β-(morpholino)ethyl-5-phenylsalicylate to precipitate the hydrochloride. Recrystallization from dioxane yielded 41.9 gm. of β-(morpholino)ethyl-5-phenylsalicylate hydrochloride, M.P. 180–181° C. A second recrystallization from dioxane yielded 34.3 gm. of the said hydrochloride, M.P. 182–183° C.

*Chloride analysis.*—Calculated 9.76%; found, 9.66%.

Evaporation of the ether from the above filtrate yielded 21.5 gm. of unreacted methyl-5-phenylsalicylate, melting point 91–94° C.

In the foregoing procedure, methyl-5-phenylsalicylate is reacted with β-hydroxyethylmorpholine in the presence of a catalytic amount of an alkali metal alkoxide, preferably sodium methoxide, in an organic solvent, such as ligroin. The product of this reaction is β-(morpholino)ethyl-5-phenylsalicylate, which can be isolated and purified in the usual manner, as by drying over anhydrous sodium sulfate followed by washing and recrystallization, or the said product can be treated in situ with an acid to produce the corresponding acid addition salt. Of particular interest for the preparation of acid addition salts are those inorganic and organic acids which yield rematologically acceptable acid addition salts, such as hydrochloric (preferably dry hydrogen chloride), hydrobromic, hydriodic, sulfuric, phosphoric, acetic, citric, tartaric, succinic, malic, maleic, benzoic, salicylic lactic and the like. The resulting acid addition salt can be purified by the usual method and employed as a principal active ingredient in the compositions of this invention.

The β-(morpholino)ethyl-5-phenylsalicylate possesses marked anti-erythema activity. The said active ingredient is frequently employed as a dermatologically acceptable acid addition salt preferably the hydrochloride. Various formulations containing from 0.005 to 2% by weight of β-(morpholino)ethyl-5-phenylsalicylate hydrochloride have been employed topically against experimentally induced erythema in humans a total of 258 times. Results were "satisfactory" a total of 232 times. Generally, concentrations of about 0.001% to about 10% are effective, from about 0.5% to about 3% being preferred.

A suitable cream incorporating β-(morpholino)ethyl-5-phenylsalicylate hydrochloride is prepared as indicated in Example 1 from the following ingredients:

| | Percent |
|---|---|
| Stearic acid | 18.0 |
| White mineral oil | 5.0 |
| Propylene glycol | 5.0 |
| Glyceryl monostearate | 5.0 |
| Potassium hydroxide | 1.0 |
| Methylparaben | 0.1 |
| Propylparaben | 0.05 |
| β-(Morpholino)ethyl-5-phenylsalicylate hydrochloride | 1.0 |
| Water, q.s. | |

Application of the above cream by inunction twice daily to the erythematous area provides early relief from the erythema.

Substitution of other dermatologically acceptable acid addition salts, such as those produced from such acids as hydrochloric, hydrobromic, hydriodic, sulfuric, phosphoric, acetic, citric, tartaric, succinic, malic, maleic, benzoic, salicylic, lactic and the like, for the hydrochloride salt above gives similarly effective compositions.

*Example 13.—β-(Tertiary-butylamino)ethyl-5-phenylsalicylate hydrochloride*

The novel β-(tertiary-butylamino)ethyl-5-phenylsalicylate hydrochloride of the formula

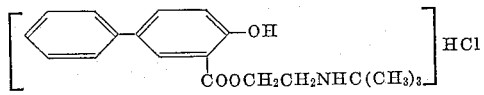

was prepared by the procedure which follows. To a 500-ml. round-bottom flask fitted with a Dean-Stark water trap was added 22.8 gm. of methyl-5-phenylsalicylate, 11.7 gm. of β-tertiary-butylaminoethanol, 2.0 gm. of sodium methoxide and 200 ml. of heptane. The resulting mixture was refluxed with continuous stirring for 24 hours. The hot solution was then filtered to remove the sodium methoxide and the filtrate concentrated to a syrup. This syrup was then dissolved in ether and the ether solution washed with water until the washings were no longer alkaline. Drying the ether solution over anhydrous sodium sulfate was productive of β-(tertiary-butylamino)ethyl-5-phenylsalicylate. Introduction of dry hydrogen chloride to the ether solution of the thus isolated β-(tertiary-butylamino)ethyl-5-phenylsalicylate gave a precipitate of 9.0 gm. of β-(tertiary-butylamino)ethyl-5-phenylsalicylate hydrochloride, M.P. 185–187° C.

*Chloride analysis.* — Calculated, 10.16%; found, 10.06%.

Treatment of the β-(tertiary-butylamino)ethyl-5-phenylsalicylate with an acid other than hydrochloric, as represented in the hydrogen chloride above, e.g., with acids producing dermatologically acceptable acid addition salts such as sulfuric, acetic, hydrobromic, phosphoric, citric, tartaric, and the like, is productive of similarly useful acid addition salts of the said β-(tertiary-butylamino)ethyl-5-phenylsalicylate.

The β-(tertiary-butylamino)ethyl-5-phenylsalicylate and its dermatologically acceptable acid addition salts, preferably the hydrochloride, are effective anti-erythema agents. For example, various formulations incorporating 0.5–2% β-(tertiary-butylamino)ethyl-5-phenylsalicylate hydrochloride were employed against experimentally induced erythema in humans a total of 40 times. Results were "satisfactory" 30 times. Generally, concentrations of about 0.001% to about 10% are effective, from about 0.5% to about 3% being preferred.

A suitable cream incorporating β-(tertiary-butylamino) ethyl-5-phenylsalicylate hydrochloride can be prepared by the procedure of Example 1 from the following materials:

| | Percent |
|---|---|
| Stearic acid | 18.0 |
| White mineral oil | 5.0 |
| Propylene glycol | 5.0 |
| Glyceryl monostearate | 5.0 |
| Potassium hydroxide | 1.0 |
| Methylparaben | 0.1 |
| Propylparaben | 0.05 |
| β-(Tertiary-butylamino)ethyl-5-phenylsalicylate hydrochloride | 1.0 |
| Water, q.s. | |

Application of the above cream by inunction to the affected areas twice daily affords effective treatment of the erythema.

Substitution of other dermatologically acceptable acid addition salts, such as the sulfate, acetate, hydrobromide, phosphate, citrate, tartrate and the like, for the hydrochloride above gives similarly effective compositions.

*Example 14.—β-(Dimethylamino)ethyl-5-phenylsalicylate hydrochloride*

A suitable cream ointment formulation for the topical treatment of erythema incorporating β-(dimethylamino) ethyl-5-phenylsalicylate hydrochloride of the formula

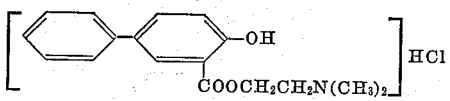

is prepared by the method of Example 1 from the following materials:

| | Percent |
|---|---|
| Propylparaben | 0.05 |
| Methylparaben | 0.1 |
| Stearic acid | 18.0 |
| Light white mineral oil | 5.0 |
| Diethylene glycol monoethyl ether | 5.0 |
| Potassium hydroxide | 1.0 |
| β-(Dimethylamino)ethyl-5-phenylsalicylate hydrochloride | 2.0 |
| Water, q.s. | |

Various formulations containing 0.05–2% β-(dimethylamino)ethyl-5-phenylsalicylate hydrochloride have been tested topically on human subjects against experimentally induced erythema 93 times. Results were "satisfactory" 69 times. Generally, concentrations of about 0.001% to about 10% are effective, from about 0.5% to about 3% being preferred.

Other dermatologically acceptable acid addition salts, such as the sulfate, phosphate, and the like can be substituted for the hydrochloride above.

*Example 15.—Trifluoroethyl-5-phenylsalicylate*

The novel trifluoroethyl-5-phenylsalicylate of the formula

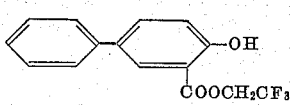

was prepared by the procedure which follows. To a three-neck, round-bottom flask equipped with a mechanical stirrer was added 11.6 gm. of 5-phenylsalicyloyl chloride and 5.0 gm. of trifluoroethanol. After thorough mixing, 1.3 gm. of aluminum chloride was added and the resulting mixture stirred at room temperature for one-half hour. Heat was then applied until the temperature reached 40° C., which temperature was maintained for 15 minutes. A light yellow product was formed which on recrystallization twice from ethanol-charcoal gave 7.0 gm. (49% of theoretical) of trifluoroethyl-5-phenylsalicylate, M.P. 120–122° C., purity indicated from determination of saponification equivalent, 100.1%.

Trifluoroethyl-5-phenylsalicylate was found to exhibit anti-erythema activity. In various formulations, the said active ingredient was employed topically in a concentration of 0.1–2.0% against experimentally induced erythema in human subjects a total of 30 times. Results were "satisfactory" 15 times. Generally, concentrations of about 0.001% to about 10% are effective, from about 0.5% to about 3% being preferred.

A suitable cream ointment for topical use in the treatment of erythema is prepared by the method of Example 1 from the following materials:

| | Percent |
|---|---|
| White mineral oil | 12.5 |
| Glyceryl monostearate | 3.5 |
| Cetyl alcohol | 3.5 |
| Diethyleneglycol monoethyl ether | 5.0 |
| Sorbitan monostearate | 1.5 |
| Triethanolamine | 1.0 |
| Propylparaben | 0.05 |
| Methylparaben | 0.1 |
| Perfume | 0.2 |
| Trifluoroethyl-5-phenylsalicylate | 2.0 |
| Water, q.s | |

Application of the foregoing cream ointment by inunction twice daily to the affected areas gives relief from the erythema.

*Example 16.—N-(o-aminophenyl)-5-phenylsalicylamide*

The novel N-(o-aminophenyl)-5-phenylsalicylamide of the formula

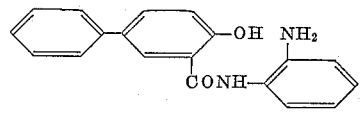

was prepared by the procedure which follows. To a 300-ml. round-bottom flask fitted with a Dean-Stark water trap was added 10 gm. of 5-phenylsalicylic acid, 5.1 gm. of o-phenylenediamine and 100 ml. of xylene. The resulting solution was refluxed for 5 hours. The solid which precipitated on cooling the reaction mixture was removed by filtration and crystallized first from aqueous ethanol and then from water, giving light orange crystals of N-(o-aminophenyl)-5-phenylsalicylamide, M.P. 147–148° C.

*Analysis.*—Nitrogen: calculated, 8.90%; found, 8.40%.

The N-(o-aminophenyl)-5-phenylsalicylamide was found to have anti-erythema activity. Various formulations of N-(o-aminophenyl)-5-phenylsalicylamide were applied topically against experimentally induced erythema in humans a total of 12 times. Results were "satisfactory" all 12 times. Generally, concentrations of about 0.001% to about 10% are effective, from about 0.5% to about 3% being preferred.

A suitable lotion incorporating N-(o-aminophenyl)-5-phenylsalicylamide can be prepared by the procedure of Example 1 from the following materials:

| | Percent |
|---|---|
| White mineral oil | 7.0 |
| Ethylene glycol monostearate | 3.0 |
| Glyceryl monostearate | 3.0 |
| Lanolin | 1.0 |
| Stearic acid | 1.0 |
| Sodium hydroxide | 0.5 |
| Propylene glycol | 4.5 |
| Propylparaben | 0.05 |
| Methylparaben | 0.1 |
| Perfume | 0.2 |
| N-(o-aminophenyl)-5-phenylsalicylamide | 1.0 |
| Water, q.s. | |

Application of the above lotion by inunction to affected areas twice daily gives early reduction of the erythema.

Example 17.—2'-(2-hydroxy-5-phenyl) phenylbenzimidazole

The novel 2'-(2-hydroxy-5-phenyl)phenylbenzimidazole of the formula

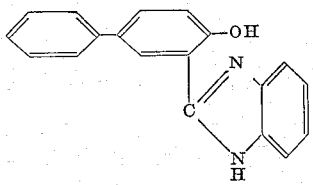

was prepared by the procedure which follows. To a 300-ml. round-bottom flask fitted with a Dean-Stark water trap was added 20 gm. of 5-phenylsalicylic acid, 10 gm. of o-phenylenediamine and 150 ml. of xylene. The resulting solution was refluxed until the theoretical amount of water had separated, which occurred in approximately 20 hours. The 2'-(2-hydroxy-5-phenyl)phenylbenzimidazole precipitated out upon cooling as a bluish solid which was washed with hot water and recrystallized from aqueous ethanol to yield 14.5 gm. of light blue crystals, M.P. 197–199° C. The crystalline product was dissolved in ether and the solution washed with 5% sodium bicarbonate solution to remove unreacted 5-phenylsalicylic acid. Evaporation of the ether yielded 2'-(2-hydroxy-5-phenyl)phenylbenzimidazole, M.P. 238–240° C.

*Nitrogen analysis.*—Calculated, 9.45%; found, 9.37%.

The 2'-(2-hydroxy-5-phenyl)phenylbenzimidazole has been found to possess anti-erythema activity. Various formulations containing 2% of the said active ingredient have been employed against experimentally induced erythema in humans by inunction to affected areas a total of 40 times. Results were "satisfactory" 26 times. Generally, concentrations of about 0.001% to about 10% are effective, from about 0.5% to about 3% being preferred.

A suitable lotion incorporating 2'-(2-hydroxy-5-phenyl) phenylbenzimidazole for topical application can be prepared from the following materials:

| | Percent |
|---|---|
| Heavy mineral oil | 7.0 |
| Glyceryl monostearate | 3.0 |
| Ethylene glycol monostearate | 3.0 |
| Lanolin | 1.0 |
| Stearic acid | 1.0 |
| Methylparaben | 0.1 |
| Propylparaben | 0.05 |
| Propylene glycol | 4.5 |
| Potassium hydroxide | 0.5 |
| 2'-(2-hydroxy-5-phenyl)phenylbenzimidazole | 2.0 |
| Water, q.s. | |

Application of the above lotion by inunction twice daily to the affected area gives early relief from the erythema.

The foregoing examples, as previously indicated, are intended to serve as illustrations of the compositions and products contemplated by the present invention. It is the presence of the principal active ingredients, when the compositions are applied by inunction in the conventional manner, that accounts for the efficacy of the products. The community of properties shared by the principal active ingredients as defined herein is therefore represented in the effectiveness of such compositions as those specifically described in preventing the onset of severe erythema or in alleviating the distress associated with an established erythema and contributing to the restoration of the affected area. It is to be observed that the present invention contemplates topical compositions incorporating, in addition to those shown as representative, other principal active ingredients falling within the generic formula earlier described.

It is to be understood therefore that the present invention is not to be limited to the exact compositions or methods of use shown and described herein, as obvious modifications and equivalents will be apparent to one skilled in the art; the invention is therefore to be limited only by the scope of the appended claims.

What is claimed is:

1. A composition which comprises: from about 0.001% to about 10% of a principal active ingredient selected from the group consisting of a compound of the formula:

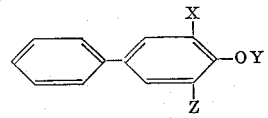

wherein X is a member selected from the group consisting of (1) hydrogen, (2) acetyl, (3) amino and (4)

$$-CH_2CH=CH_2$$

Y is a member selected from the group consisting of (1) hydrogen, (2) lower alkyl containing 1 through 5 carbon atoms, and (3) acetyl; and Z is a member selected from the group consisting of (1) carboxy,
(2) carbalkoxy in which the alkyl groups contain 1 through 5 carbon atoms,
(3) $-COOCH_2CH_2N(CH_3)_2$
(4) $-COOCH_2CH_2NHC(CH_3)_3$
(5) 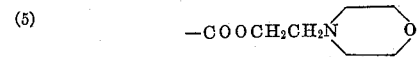
(6) $-COOCH_2CF_3$
(7) 

and
(8) 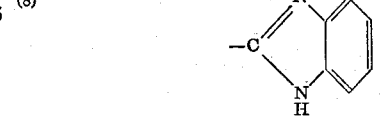

and dermatologically acceptable acid addition salts of such compounds dispersed in a pharmaceutically acceptable dermatalogic base.

2. A composition for topical use which comprises: from about 0.001% to about 10% 3-acetyl-5-phenylsalicylic acid of the formula

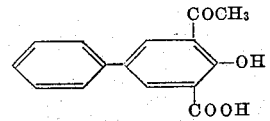

dispersed in a pharmaceutically acceptable dermatologic base.

3. A composition for topical use which comprises: from about 0.5% to about 3% 3-acetyl-5-phenylsalicylic acid, dispersed in a pharmaceutically acceptable dermatologic base.

4. A composition for topical use which comprises: from about 0.001% to about 10% of a principal active ingredient selected from the group consisting of (1) a compound of the formula

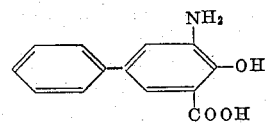

and (2) pharmaceutically acceptable acid addition salts thereof, dispersed in a pharmaceutically acceptable dermatologic base.

5. A composition for topical use which comprises: from about 0.5% to about 3% 3-amino-5-phenylsalicylic acid hydrochloride, dispersed in a pharmaceutically acceptable dermatologic base.

6. A composition for topical use which comprises: from about 0.001% to about 10% of a principal active ingredient of the formula

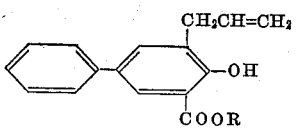

wherein R is a lower alkyl group of 1 through 5 carbon atoms, dispersed in a pharmaceutically acceptable dermatologic base.

7. A composition for topical use which comprises: from about 0.5% to about 3% methyl-3-allyl-5-phenylsalicylate, dispersed in a pharmaceutically acceptable dermatologic base.

8. A composition for topical use which comprises: from about 0.001% to about 10% of a principal active ingredient of the formula

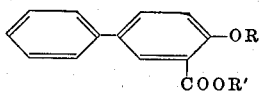

wherein R is a member selected from the group consisting of hydrogen, acetyl, and a lower alkyl of 1 through 5 carbon atoms, and R′ is a member selected from the group consisting of hydrogen, and a lower alkyl of 1 through 5 carbon atoms, dispersed in a pharmaceutically acceptable dermatologic base.

9. A composition for topical use which comprises: from about 0.5% to about 3% methyl-2-methoxy-5-phenylbenzoate, dispersed in a pharmaceutically acceptable dermatologic base.

10. A composition for topical use which comprises: from about 0.5% to about 3% methyl-2-acetoxy-5-phenylbenzoate, dispersed in a pharmaceutically acceptable dermatologic base.

11. A composition for topical use which comprises: from about 0.5% to about 3% 5-phenylsalicylic acid, dispersed in a pharmaceutically acceptable dermatologic base.

12. A composition for topical use which comprises: from about 0.5% to about 3% methyl-5-phenylsalicylate, dispersed in a pharmaceutically acceptable dermatologic base.

13. A composition for topical use which comprises: from about 0.5% to about 3% 2-acetoxy-5-phenylbenzoic acid, dispersed in a pharmaceutically acceptable dermatologic base.

14. A composition for topical use which comprises: from about 0.5% to about 3% ethyl-5-phenylsalicylate, dispersed in a pharmaceutically acceptable dermatologic base.

15. A composition for topical use which comprises: from about 0.5% to about 3% butyl-5-phenylsalicylate, dispersed in a pharmaceutically acceptable dermatologic base.

16. A composition for topical use which comprises: from about 0.001% to about 10% of a principal active ingredient selected from the group consisting of (1) compounds of the formula

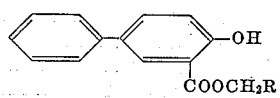

wherein R is a radical selected from the group consisting of —CH$_2$NHC(CH$_3$)$_2$, —CH$_2$N(CH$_3$)$_2$, and

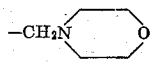

and (2) the pharmaceutically acceptable acid addition salts thereof, dispersed in a pharmaceutically acceptable dermatologic base.

17. A composition for topical use which comprises: from about 0.5% to about 3% β-(morpholino)ethyl-5-phenylsalicylate hydrochloride, dispersed in a pharmaceutically acceptable dermatologic base.

18. A composition for topical use which comprises: from about 0.5% to about 3% β-(tertiary-butylamino)ethyl-5-phenylsalicylate hydrochloride, dispersed in a pharmaceutically acceptable dermatologic base.

19. A composition for topical use which comprises: from about 0.5% to about 3% β-(dimethylamino)ethyl-5-phenylsalicylate hydrochloride, dispersed in a pharmaceutically acceptable dermatologic base.

20. A composition for topical use which comprises: from about 0.001% to about 10% of a principal active ingredient of the formula

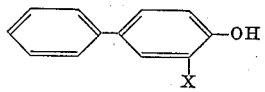

wherein X is a radical selected from the group consisting of

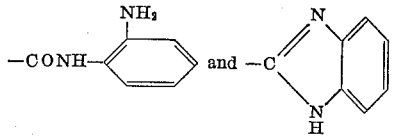

dispersed in a pharmaceutically acceptable dermatologic base.

21. A composition for topical use which comprises: from about 0.5% to about 3% N-(o-amniophenyl)-5-phenylsalicylamide, dispersed in a pharmaceutically acceptable dermatologic base.

22. A composition for topical use which comprises: from about 0.5% to about 3% 2′-(2-hydroxy-5-phenyl) benzimidazole, dispersed in a pharmaceutically acceptable dermatologic base.

23. A composition for topical use which comprises: from about 0.001% to about 10% of a principal active ingredient of the formula

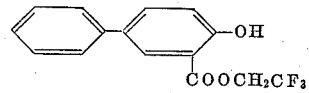

dispersed in a pharmaceutically acceptable dermatologic base.

24. A composition for topical use which comprises: from about 0.5% to about 3% trifluoroethyl-5-phenylsalicylate, dispersed in a pharmaceutically acceptable dermatologic base.

25. A method for the treatment of erythema which comprises: applying to the skin a composition which comprises from about 0.001% to about 10% of a principal active ingredient selected from the group consisting of a compound of the formula:

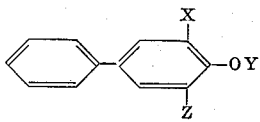

wherein X is a member selected from the group consisting of (1) hydrogen, (2) acetyl, (3) amino and (4) —CH$_2$CH=CH$_2$; Y is a member selected from the group consisting of (1) hydrogen, (2) lower alkyl containing 1 through 5 carbon atoms, and (3) acetyl; and Z is a member selected from the group consisting of (1) carboxy, (2) carbalkoxy in which the alkyl groups contain 1 through 5 carbon atoms, (3) carbphenoxy (4)         —COOCH$_2$CH$_2$N(CH$_3$)$_2$ (5)         —COOCH$_2$CH$_2$NHC(CH$_3$)$_3$ (6)         —COOCH$_2$CH$_2$N⟨O⟩

(7)         —COOCH$_2$CF$_3$ (8) 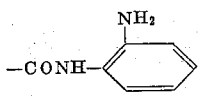

and (9) 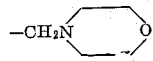

and dermatologically acceptable acid addition salts of such compounds dispersed in a pharmaceutically acceptable dermatologic base.

26. A method for the prevention and treatment of erythema which comprises: applying to the skin a composition which comprises from about 0.001% to about 10% 3-acetyl-5-phenylsalicyclic acid of the formula

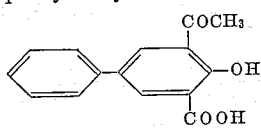

dispersed in a pharmaceutically acceptable dermatologic base.

27. A method for the prevention and treatment of erythema which comprises: applying to the skin a composition which comprises from about 0.001% to about 10% of a principal active ingredient selected from the group consisting of (1) a compound of the formula

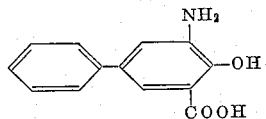

and (2) pharmaceutically acceptable acid addition salts thereof, dispersed in a pharmaceutically acceptable dermatologic base.

28. A method for the prevention and treatment of erythema which comprises: applying to the skin a composition which comprises from about 0.001% to about 10% of a principal active ingredient of the formula

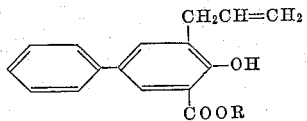

wherein R is a lower alkyl group of 1 through 5 carbon atoms, dispersed in a pharmaceutically acceptable dermatologic base.

29. A method for the treatment of erythema which comprises: applying to the skin a composition which comprises from about 0.001% to about 10% of a principal active ingredient of the formula

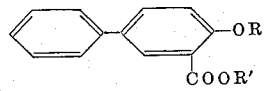

wherein R is a member selected from the group consisting of hydrogen, acetyl, and a lower alkyl of 1 through 5 carbon atoms, and R' is a member selected from the group consisting of hydrogen, a lower alkyl of 1 through 5 carbon atoms, and phenyl, dispersed in a pharmaceutically acceptable dermatologic base.

30. A method for the prevention and treatment of erythema which comprises: applying to the skin a composition which comprises from about 0.001% to about 10% of a principal active ingredient selected from the group consisting of (1) compounds of the formula

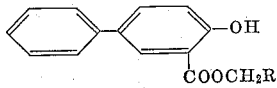

wherein R is a radical selected from the group consisting of $CH_2NHC(CH_3)_2$, $-CH_2N(CH_3)_2$, and

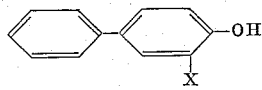

and (2) the pharmaceutically acceptable acid addition salts thereof, dispersed in a pharmaceutically acceptable dermatologic base.

31. A method for the prevention and treatment of erythema which comprises: applying to the skin a composition which comprises from about 0.001% to about 10% of a principal active ingredient of the formula

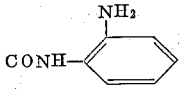

wherein X is a radical selected from the group consisting of

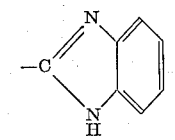

dispersed in a pharmaceutically acceptable dermatologic base.

32. A method for the prevention and treatment of erythema which comprises: applying to the skin a composition which comprises from about 0.001% to about 10% of a principal active ingredient of the formula

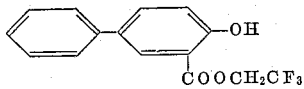

dispersed in a pharmaceutically acceptable dermatologic base.

References Cited by the Examiner

UNITED STATES PATENTS

| | | | |
|---|---|---|---|
| 1,969,354 | 8/1934 | Christiansen | 260—520 |
| 2,338,416 | 1/1944 | Fales | 167—58 |
| 2,594,350 | 4/1952 | Sahyun | 260—473 |
| 2,663,712 | 12/1953 | Tulagin | 260—309.2 |
| 2,701,249 | 2/1955 | Koniuszy | 260—309.2 |
| 2,729,678 | 1/1956 | Sahyun | 260—559 |
| 2,732,402 | 1/1956 | Surrey | 260—562 |
| 2,744,916 | 5/1956 | Sahyun | 260—473 |
| 2,759,964 | 8/1956 | Beman | 260—473 |
| 2,759,966 | 8/1956 | Beman | 260—473 |
| 2,765,338 | 10/1956 | Suter | 260—562 |
| 2,801,201 | 7/1957 | Kipnis | 167—58 |
| 2,847,461 | 8/1958 | Lecher | 260—519 |
| 2,852,557 | 9/1958 | Schraufstatter | 260—519 |

OTHER REFERENCES

De Navarre, The Chemistry and Manufacture of Cosmetics, D. Van Nostrand Co., Inc. New York, (1941), pp. 590–593 and 612–615.

ALBERT T. MEYERS, *Primary Examiner.*

JAMES CACCIAPAGLIA, JR., JULIAN S. LEVITT,
*Examiners.*

ANNA P. FAGELSON, VERA C. CLARKE,
*Assistant Examiners.*